INVENTOR
John G. Sommer

United States Patent Office 3,536,656
Patented Oct. 27, 1970

3,536,656
LIGHT-WEIGHT FLEXIBLE INSULATING MATERIAL
John G. Sommer, Cuyahoga Falls, Ohio, assignor to The General Tire & Rubber Company, a corporation of Ohio
Filed Feb. 21, 1966, Ser. No. 529,086
Int. Cl. C08g 45/06, 51/04, 51/14
U.S. Cl. 260—37
4 Claims

ABSTRACT OF THE DISCLOSURE

A flexible, ablative, light-weight insulating material suitable for use as a lining for rocket motors and the like, is composed of the reaction product of an aromatic epoxy resin and a polysulfide flexibilizing agent along with appreciable amounts of unreacted boric acid and hollow, minute, low density spheres or balloons. The composition is trowelable and is capable of curing at room temperature.

---

Figure 1:
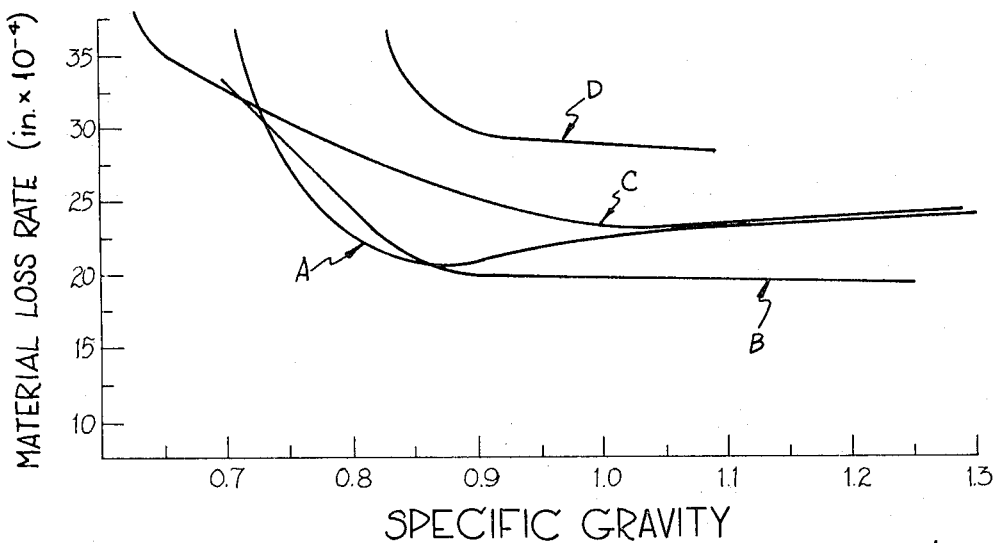

During the combustion of propellants within the confines of the chamber of a rocket engine, extremely turbulent flow conditions and elevated pressures are encountered. This environment places a severe strain on the rocket chamber and the exhaust nozzles as well as other parts of the rocket structure. Even though the combustion of the rocket propellants is of relatively short duration, the extreme temperatures and turbulence can burn through even the strongest and best high temperature alloys of iron, titanium, tungsten, and the like if these alloys are otherwise unprotected. Consequently, a vital portion of the rocket, or the entire rocket itself, can be eventually destroyed or rendered incapable of completing its designated task.

The extremely active interest in rocket motors, and the increased utilization of high temperatures in non-rocket applications, has necessitated a search for new materials which can be used as high temperature insulation. Through these efforts it has been found that various materials can be applied to the surface of metal alloys and other structural materials to serve as thermal insulating barriers. Their usefulness is typically measured by their ability to withstand the extreme temperatures and turbulent conditions to which they might be exposed. Among these materials are various ceramics, plastics, such as phenolic, and polyester resins and elastomeric materials.

One of the more successful rubber-like elastomeric materials is that described in copending application Ser. No. 153,675, filed on Nov. 20, 1961 abandoned in favor of a continuation-in-part application S.N. 519,195, filed on Jan. 7, 1966, now U.S. Pat. No. 3,347,047. The insulation material of that particular invention consists primarily of 3 to 200 parts of asbestos fibers of a particular size per 100 parts of elastomer along with various other compatible materials. This material, and other rubber-like elastomer systems, are ablative, that is, they are consumed in service within the rocket chamber in such a manner that the chamber is protected from the fuel combustion gases and elevated temperatures. The incorporation of asbestos fibers into the elastomer markedly improves the ability of the lining to withstand high flame temperatures and high velocity flow conditions prevalent within the rocket chamber during combustion.

Elastomeric insulating materials of the above described kind are generally compounded on a typical rubber mill and are calendered into sheets of uniform thickness and width. These sheets are then cut to size, are applied to the interior surfaces of the thrust chamber and are then cured in place, or alternatively are precured to their final contour and then inserted and secured into position within the chamber utilizing a suitable adhesive or the like.

Regardless of whether the sheets are precured before installation, or are first installed and thereafter cured in situ, both methods are laborious and time consuming, and result in a certain amount of material being wasted.

The problems which are inherent with the use of sheets of millable elastomeric material were at least partially overcome with the discovery of a trowelable insulating material which was chemically compatible with the insulations in use at that time. The details of this trowelable insulation are described in Ser. No. 362,589 filed Apr. 27, 1964, now U.S. Pat. 3,457,215, by the present inventor and tilted "Trowelable Insulating Material Containing Boric Acid and a Flexibilized Epoxy Resin," the disclosure of said application being incorporated herein by reference. The insulating material of that invention comprises a flexible epoxy resin which includes boric acid as well as a curing agent and fillers such as asbestos or the like.

Epoxy resins containing flexibilizing agents such as polyamides and polysulfides have been known in the art for a number of years. Yet, these resins, unless improved by the addition of boric acid were not found to be useful as high temperature insulators. As stated in Ser. No. 362,589, the boric acid can be added in an amount of between 1 and 200 parts by weight for every 100 parts of epoxy resin, although as a practical matter, the addition of amounts in excess of 50 parts does not result in any appreciable improvement and is therefore generally unwarranted.

Although the above-mentioned flexible epoxy resin constitutes an otherwise satisfactory trowelable rocket insulation, attempts are constantly being made to reduce the weight of the various rocket components, including the insulation. It is to this end that the present invenion is directed.

Accordingly, it is one object of this invention to produce a thermal insulation material which is relatively light in weight but which possesses desirable insulating properties.

Another object of this invention is a trowelable insulating material comprising the reaction product of an epoxy resin and a flexibilizing agent, and containing boric acid, said material being improved by the addition of small hollow spheres thereto.

Yet another object is a light-weight flexible insulating material useful as a lining in rocket motors and the like, said material comprising the reaction product of a polysulfide and an epoxy resin and including asbestos fibers and boric acid to improve the insulating properties thereof and a substantial amount of minute hollow spheres to reduce the density thereof.

Figure 2:
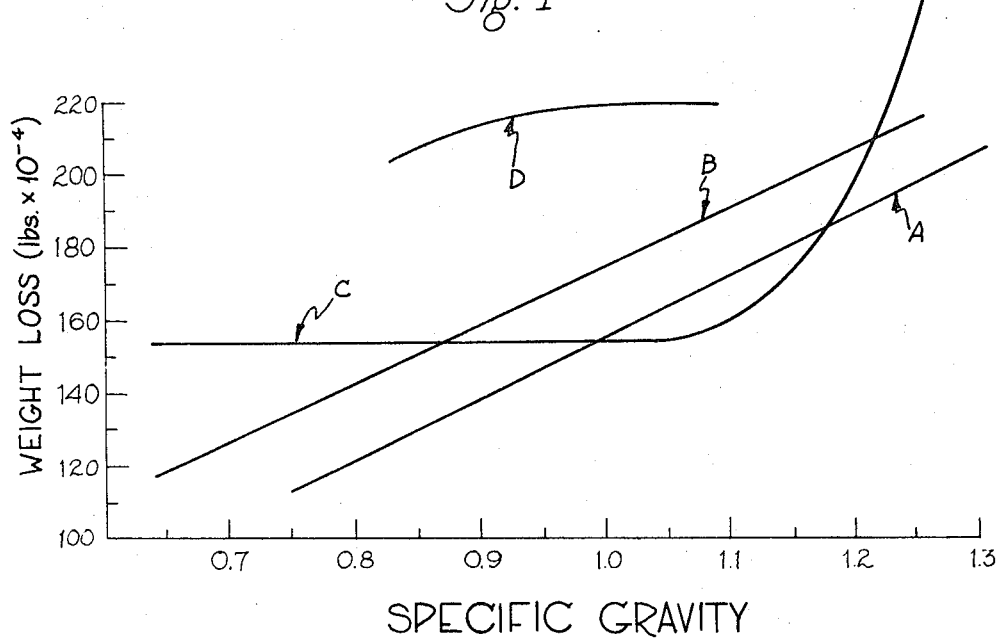

These and other objects are accomplished in the manner to be hereinafter described and claimed, with particular reference being given to the drawing wherein:

FIG. 1 is a graph showing the correlation between specific gravity and material loss rate under ablation conditions for several different insulating compositions composed primarily of boric acid, and the reaction product of a polysulfide and an epoxy resin, and FIG. 2 is a plot of specific gravity vs. weight loss for these compositions under the same conditions.

The insulating material of the present invention comprises the reaction product of an epoxy resin and a flexibilizing agent, boric acid and other compatible components to which is added a substantial quantity of small hollow low density spheres or microballoons. The resultant product is trowelable and flexible, and is capable of curing at room temperatures. Surprisingly, however, its high temperature insulating properties are equal to, or surpass comparable materials which do not contain hollow spheres and which consequently have much higher densities.

The epoxy resins useful in the invention are those which, when reacted with a flexibilizer and blended with the hollow spheres, give a trowelable composition. Resins of this type are typically characterized as being liquids at room temperatures. Because of their better strength properties, aromatic epoxy resins are preferred over the aliphatic resins.

Mercaptan terminated aliphatic polysulfides are the preferred flexibilizing agents in the teachings of the present invention. These polyfunctional polymers contain disulfide linkages in the backbone chain. They desirably have an average molecular weight of at least 300 and should naturally be compatible with the epoxy resin. Other flexibilizing agents, such as polyamides, certain diamines and polyesters, can also be used.

The epoxy resin and the polysulfide react chemically to form a chain composition of alternative molecules of these two components, with some self-polymerization of the epoxy resin also occurring. This reaction proceeds rather slowly and consequently a curing agent or a catalyst is generally needed to obtain complete polymerization within a reasonable length of time. Although there are a large number of commercially available curing agents that can be used with the present invention, one which has been found to be quite suitable for this purpose is a 2,4,6-tri(dimethyl aminomethylphenol).

Generally, the ratio of the effective equivalent weight of the polysulfide to that of the epoxy resin should not exceed 1/1. As the amount of polysulfide approaches this upper limit, there is a very noticeable tendency for the polysulfide to prematurely terminate the polymerization reaction. On the other hand, as this equivalent weight ratio approaches zero, the flexibility of the insulating composition also decreases thereby resulting in an end product which is brittle and is prone to disintegrate when bonded to a rocket structure which undergoes appreciable thermal expansion and is subjected to severe shock during firing. In the aforementioned patent application S.N. 362,589, the ratio of these two components is defined on a weight basis by stating that between about 75 and about 250 parts of polysulfide can be used per 100 parts by weight of epoxy resin.

There are several types and sizes of hollow spheres which can be used in the present invention to reduce the density of the flexible, trowelable insulating material. Among these are alkali metal silicate-based glass spheres of the type marketed by Emerson and Cuming, Inc. under the name Eccospheres SI. These hollow spheres have a specific gravity of 0.3, a particle size range of about 30 to 300 and are stable up to temperatures of about 2500° F. Also included are various low density ceramic and thermosetting plastic spheres, the latter being represented by phenolic microballoons marketed by Union Carbide Plastic Co., under the trade name BJO–0930.

The amounts of hollow spheres which can be incorporated into the insulation depend upon a number of factors including the types and amounts of flexibilizing agent and epoxy resin being used, the frangibility of the spheres, the desired resultant density of the insulation, the viscosity of the epoxy resin and the amounts and nature of the other additives and fillers. It is possible to include as much as 200 parts by weight of microballoons into the composition based upon 100 parts of epoxy resin, but the practical upper limit is about 50 to 60 parts. The incremental improvements above these levels are generally not sufficient to warrant higher levels.

Various inert fillers such as asbestos fibers can also be incorporated into the insulating composition in amounts up to about 40 parts per 100 parts of epoxy resin.

As previously stated, boric acid greatly enhances the insulating values of the composition and can be used in amounts up to 200 parts by weight per 100 parts of epoxy resin. It has been found that 50 parts, in practice, is a reasonable upper limit, and if less than 1 part is used, there is no noticeable improvement.

The following illustration is presented to clarify the teachings of the invention, without serving as a limitation thereon.

A basic formulation comprising the following components:

| | Parts by weight |
|---|---|
| Liquid polysulfide polymer | 180 |
| Epoxy resin (epichlorohydrin/bisphenol A) | 100 |
| Curative (tertiary amine) | 10 |
| Boric acid | 20 |
| Asbestos fibers | 20 | was used to prepare four groups of insulating compositions differing from one another in the following respect:

Group A—the asbestos fibers were of such a size that approximately 70% passed through a 200 mesh screen in the standard McNett wet screen test. Separate sample were prepared containing respectively 0, 10, 20, 30, 40, and 50 parts of hollow glass spheres, per 100 parts of epoxy resin and were tested in the manner to be hereinafter described. These spheres had a particle size distribution of between 30 and 300μ and a density of about 0.3 grams per cubic centimeter.

Group B—The fibers were substantially longer than those in Group A, with between about 15 and 30% passing through a 200 mesh screen. Hollow glass spheres were again used in the formulation, and samples with varying amounts of these spheres were prepared.

Group C—Hollow spheres of a phenolic thermosetting resin were used in place of glass spheres.

Group D—Ten parts of an organic blowing agent (p,p'-oxybis (benzenesulfonyl hydrazide)) per 100 parts of epoxy resin were used in place of microballoons to produce samples of varying densities.

Test discs two inches in diameter and one-half inch thick were molded from each of the samples in groups A, B and C. These discs were then cured for about 24 hours at room temperature. The group D discs were prepared by charging a certain quantity of the material into a properly dimensioned mold, closing the mold and heating to an elevated temperature to cause the material to expand and fill the mold cavity. By varying the amount of the initial charge, discs of differing densities were produced.

The following table shows, for Groups A, B and C, the correlation between the amounts of spheres added to the formulations and the resultant density.

| Amount added (by weight) | Specific gravity | | |
|---|---|---|---|
| | A | B | C |
| 0 | 1.30 | 1.25 | 1.29 |
| 10 | 1.18 | | |
| 20 | 1.08 | 1.11 | 1.04 |
| 30 | 0.99 | | |
| 40 | 0.93 | 0.86 | 0.86 |
| 50 | 0.86 | | |
| 60 | | 0.79 | 0.63 |

Each of the discs in the four groups was individually subjected to the flame of an oxyacetylene torch in order to determine its comparative resistance to the flame. To standardize the tests, an oxyacetylene torch was selected which had an 0.075 inch diameter nozzle. This nozzle was positioned exactly one inch above the center of the upper surface of one of the discs, perpendicular thereto. The torch was mounted in such a manner that it could oscillate through an arc of 60° from the perpendicular, thereby changing the direction of the flame without moving the point of contact of the flame on the test disc. The purpose of this oscillation was to simulate the turbulent flow conditions which exist during the actual firing of a rocket motor. The nozzle was oscillated at a rate of 10 cycles per minute and the test was continued for 90 seconds.

The test discs were weighed before and after the test to determine the amount of weight lost during the test.

Examination of a cross section of each disc after testing revealed a bottom layer of apparently unaffected material, an intermediate layer of material which had been partially affected by the flame of the torch and a top layer of char. This char was composed of a carbonaceous material as well as the residues of the various fillers and other materials present in the composition. The thicknesses of these different layers were measured, and from these measurements was calculated the important determinant referred to as the material loss rate (MLR). The material loss rate is equal to $$\frac{T_o - T_v}{E}$$

where $T_o$ is the original thickness in inches of the disc, $T_v$ is the minimum thickness of the unaffected material (bottom layer) as measured at the center of the disc at the end of the test, and E denotes, in seconds, the length of the test period.

For each of the four groups, the values of weight loss (W) and material loss rate (MLR) were calculated for each disc and were plotted against the value of specific gravity of the disc at the commencement of the test. A line was then drawn to represent these characteristic values for each group, and the various lines were designated A, B, C, and D.

An examination of the curves in FIG. 1 reveals that the density of flexibilized epoxy resins can be reduced considerably by the incorporation of substantial quantities of microballoons into the composition without adversely affecting the material loss rate. Furthermore, the MLR of Groups A, B and C (with microballoons) is substantially better (lower) than that of the light-weight insulations produced by incorporating a blowing agent into the formulation (Group D).

Furthermore, FIG. 2 shows that as the density of a flexible epoxy resin insulation is decreased by the incorporation of increasing amounts of discrete hollow spheres therein, the weight loss (W) continues to improve when using glass spheres (curves A and B) or at least becomes relatively constant (curve C), and is better in all instances than that shown for the preblown samples (curve D).

It is therefore apparent, based on these tests that the specific gravity of trowelable flexible insulating materials of the forementioned type can be regulated and changed to meet special conditions without adversely affecting the properties of material loss rate and weight loss.

The epoxy resin used in the above tests was an epichlorohydrin/bisphenol A resin having an epoxide equivalent of 180–195 and an approximate molecular weight of 380. The polysulfide had an approximate molecular weight of 1000 and was a liquid at room temperatures. However, it is understood, as previously stated, that other epoxy resins and flexibilizing agents can be utilized in the teachings of the present invention. Furthermore, other changes can be made in the formulations without departing from the substance of this invention which is limited by the scope of the following claims.

What is claimed is:

1. A light-weight flexible and trowelable room cured, ablative insulation material comprising the polymerization product of 100 parts by weight of an aromatic epoxy resin having an average molecular weight of at least about 300 and being a liquid at room temperatures and between about 75 and about 250 parts by weight of a long chain mercaptan terminated aliphatic polysulfide having a molecular weight of at least about 300, between about 1 and about 50 parts of unreacted boric acid, and between about 10 and about 200 parts of small hollow discrete light-weight spheres.

2. The material according to claim 1 further including an inert filler composed primarily of asbestos fibers.

3. The material according to claim 1 wherein said spheres are composed of glass and have a specific gravity of approximately 0.3 and having a particle size distribution of between about 30 and about 300 microns.

4. The material according to claim 1 wherein said spheres are composed of a thermosetting resin.

References Cited
UNITED STATES PATENTS

| | | |
|---|---|---|
| 3,203,849 | 8/1965 | Katz. |
| 3,210,233 | 10/1965 | Kummer. |
| 2,978,340 | 4/1961 | Vetach. |
| 3,030,215 | 4/1962 | Vetach. |
| 2,806,509 | 9/1957 | Bozzacco. |
| 2,944,821 | 7/1960 | Mason. |
| 3,316,139 | 4/1967 | Alford. |
| 3,230,184 | 1/1966 | Alford. |
| 3,006,936 | 10/1961 | Findley. |

FOREIGN PATENTS

| | | |
|---|---|---|
| 931,000 | 1963 | Great Britain. |
| 984,486 | 2/1965 | Great Britain. |

MORRIS LIEBMAN, Primary Examiner

H. H. FLETCHER, Assistant Examiner

U.S. Cl. X.R.

260—2, 79, 79.1, 97, 830